United States Patent Office 3,271,427
Patented Sept. 6, 1966

3,271,427
3-DESOXY-17α-CHLOROETHYNYL ESTROGENIC STEROIDS AND PROCESS FOR MAKING SAME
Vladimir Petrow, Colin Michael Burgess, and Peter Feather, all of London, England, assignors to British Drug Houses, Ltd.
No Drawing. Original application July 31, 1961, Ser. No. 127,805. Divided and this application Apr. 24, 1964, Ser. No. 362,497
Claims priority, application Great Britain, Aug. 5, 1960, 27,179/60
11 Claims. (Cl. 260—397.5)

This application is a division of applicants' copending application Serial No. 127,805, filed July 31, 1961.

This invention is for improvements in or relating to organic compounds and has particular reference to a new class of steroidal materials, namely the 17α-chloroethynyl-17β-hydroxy derivatives of perhydrocyclopentenophenanthrene and to a process for their preparation.

The new compounds of the present invention have valuable biological properties or may be readily converted into compounds having valuable biological properties. Thus they have hormonal properties including oestrogenic, progestational, ovulation-inhibiting and claudogenic (see Petrow, J. Pharm. Pharmacol., 1960, 12, 1704) properties.

Thus 17α-chloroethynylestradiol is a potent oestrogenic agent when given by mouth. Its 3-methoxy derivative retains considerable oestrogenic potency having ca. 1/25 of the oestrogenic activity of stilboestrol. The value of steroidal oestrogens is well known.

17α-chloroethynyl-17β-hydroxy-19-norandrost-4-en-3-one, 17α-chloroethynyl-17β-hydroxy-6α-methyl-19-nortestosterone and 17α-chloroethynyl-3-methoxy-6-methyl-19-norandrosta-3,5-dien-17β-ol have progestational activity, which is also shown by such androstane derivatives as 17α-chloroethynyl-17β-hydroxy-6α-methylandrost-4-en-3-one, which has ca. the same progestational activity as ethisterone (pregninenolone) on oral administration.

17α-chloroethynyl - 3 - methoxy-oestra-1,3,5(10)-trien-17β-ol, 17α-chloroethynyl-17β-hydroxy-19-norandrost-4-en-3-one, 17α-chloroethynyl-17β-hydroxy-19-norandrost-5(10) - en - 3 - one, 17α-chloroethynyl-17β-hydroxy-6α-methyl-19-nortestosterone have ovulation-inhibiting properties. Steroidal compounds with ovulation-inhibiting properties are of value, for example, in the veterinary field.

The 17α-chloroethynyl - 17β - hydroxy-derivatives of: oestra-1,3,5(10)-trien, 3-methoxyoestra-1,3,5(10)-trien, 3 - hydroxyoestra - 1,3,5(10)-trien, 4-methyloestra-1,3,5 (10)-trien, 1-hydroxy-4-methyloestra-1,3,5(10)-trien, 2,4-dimethyloestra-1,3,5(10)-trien, 19-norandrost-4-en, 19-norandrost-4-en-3-one, 19-norandrost-5(10)-en-3-one, 3-methoxyoestra-2,5(10)-dien, 3-methoxy-19-norandrosta-3,5-dien, 6α-methyl-19-norandrost-4-en-3-one, 3-methoxy-6-methyl-19-norandrosta-3,5-dien, androst-4-en, 3β-hydroxy-androst-5-en, 6-methylandrost-5-en-3β-ol, 6-methylandrost-4-en-3-one, 4-methylandrost-4-en-3-one, 4-methylandrost-3-ene, androst-4-en-3-one, 1,4-dimethyloestra-1,3,5(10)-trien and 6α-methyl-5α-androstan-3-one have claudogenic properties, and the compounds having such properties are valuable in the veterinary field particularly for application to the dog and cat species. Thus unwanted litters in, for example, sheep dogs and pedigree animals and sometimes in domestic pets can be disadvantageous. By administration of one of the claudogenic compounds of the present invention the appearance of such unwanted litters may be prevented. Similarly in cats the administration of claudogenic compounds is often of value. Not only does such administration prevent the appearance of unwanted litters, but it eliminates the need for castration so that normal reproduction can take place if subsequently desired.

The claudogenic compounds of the present invention are of great value for the control of infestation by domestically-encountered rodents especially rats and mice. For example, the 3-methoxy derivative of 17α-chloroethynyloestradiol may be administered for this purpose in a suitable bait. An advantage of the claudogenic compounds of the present invention over the hitherto available rat and mouse poisons is the virtual absence of toxicity to domestic animals if the treated bait is accidentally consumed. This form of "claudogenic control" is an important advance in the control of rodent infestation.

It is an object of the present invention to provide new 17α-chloroethynyl steroids having, apart from substituents and unsaturated linkages in rings A, B, C and D, the general formula

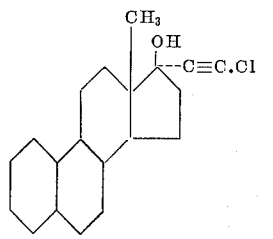

(I)

According to the present invention there is provided a process for the preparation of 17α-chloroethynyl steroids having, apart from substituents and unsaturated linkages in rings A, B, C and D, the general formula

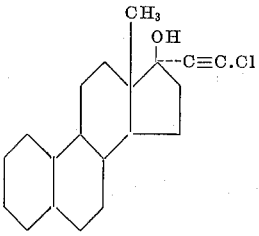

(I)

which process comprises reacting a corresponding 17-oxo-steroid with lithium chloroacetylide and subsequently regenerating the desired derivative from the complex so formed.

The lithium chloracetylide may be prepared by adding a solution of cis- or trans-1,2-dichlorethylene in an organic solvent such as ether to a solution of a lithium alkyl, for example lithium methyl, in an organic solvent such as ether. Trans-dichlorethylene is the preferred starting material. The reaction is preferably carried out under an atmosphere of nitrogen, with exclusion of moisture. The 17-oxo-steroidal starting material may first be dissolved in a non-hydroxylic organic solvent such as toluene or tetrahydrofuran. If, after its addition to the solution of lithium chloracetylide, the mixture is gently heated, with stirring, the reaction is usually complete in about 2 hours. The mixture may then be cooled and treated with reagents currently employed for decomposing the product of Grignard type reactions (see Grignard Reactions of Non-Metallic Substances, Kharasch and Reinmuth, Constable), for example, an aqueous solution of ammonium chloride, before working-up in a manner usual for reactions of the Grignard type.

It will be apparent to those skilled in the art that the process of the invention may be applied to steroids containing, in addition to the oxo-group at $C_{17}$, a variety of substituents and unsaturated linkages in rings A, B, C and D. Thus, the process of the invention may be applied to steroids containing unsaturated linkages in rings A, B, C and D, and in particular, unsaturated linkages at $\Delta^1$, $\Delta^3$, $\Delta^4$, $\Delta^{5(6)}$, $\Delta^{9(11)}$ and $\Delta^{11(12)}$, and to combinations of unsaturated linkages such, for example, as at $\Delta^2$ and $\Delta^{5(10)}$. In addition, the process may be applied to steroids containing 3 or more unsaturated linkages, together forming an aromatic system. Hydroxyl groups do not interfere with the process of the invention, in particular, hydroxyl groups at positions 3, 4, 5, 6 and 11. Hydroxyl groups may, however, sometimes be advantageously protected by prior conversion into tetrahydropyranyl derivatives and subsequently regenerated. Acyl groups may be hydrolysed during the course of the reaction with lithium chloracetylide, and may require subsequent regeneration. Alkyl, alkenyl and alkynyl groups containing up to five carbon atoms such, for example, as methyl, vinyl and propynyl groups, and in particular, methyl groups at $C_2$, $C_4$ and $C_6$, do not interfere with the process of the invention.

Oxo-groups at $C_3$, $C_4$ or $C_6$ require protection by ketal, thioketal, enamine or enol ether formation and subsequent regeneration. The enol ethers of 3-oxo-$\Delta^4$-steroids obtained in this way may be of value not only as intermediates for the preparation of the corresponding 3-oxo-$\Delta^4$-derivatives but in their own right on account of their biological properties. Sterically hindered oxo-groups, such as at $C_{11}$ when an unsaturated linkage is present in the molecule at $C_4$ or $C_5$, will in general, prove unreactive. 5,6-epoxide groups do not interfere with the process of the invention.

The process of the invention is particularly applicable to derivatives of androstane represented as general Formulae II, III, IV and V, and of oestrane represented by general Formulae VI and VII

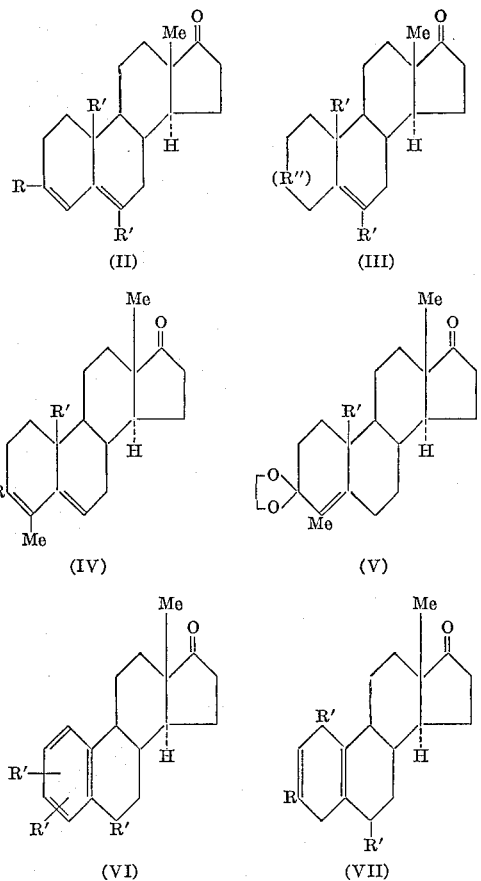

where

R is OX (where X is lower alkyl, cyclic alkyl or benzyl), or H,
R' is Me or H,
R" is

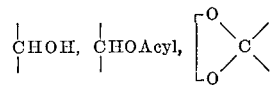

In a typical preparation of a 17α-chloroethynyl steroid containing a 3-oxo-4-ene grouping and a 17-oxo group, a 3-ketal may first be prepared by heating with an excess of ethylene glycol in the presence of p-toluene sulphonic acid, the water formed in the reaction being continuously removed (cf. Herzog, Jevnik, Tully and Hershberg, J. Amer. Chem. Soc., 1953, 75, 4425). The resulting ketal is then treated with lithium chloracetylide. The ketal group is removed by hydrolysis, usually in presence of an acid catalyst yielding the 17α-chloroethynyl-17β-hydroxy-androst-4-en-3-one derivative.

Alternatively, a 17β-hydroxy-3-oxo-$\Delta^4$-steroid may be converted into a derivative such as a 3-ketal or 3-enol ether and the secondary hydroxylic group at $C_{17}$ converted into a 17-oxo group by oxidation with, for example, chromic acid/pyridine. The 17-oxo-3-ketalised steroid thereby obtained may then be condensed with lithium chloracetylide as described above.

A procedure applicable to and particularly convenient for 3,17-dioxo-$\Delta^4$-steroids is to convert them into the 3-enol ether-17-ones by methods of prior art and to condense these materials with lithium chloracetylide, subsequently regenerating the 3-oxo-$\Delta^4$-system by treatment with H+ ions.

In the preparation of a 17α-chloroethynyl-19-nor-androstane derivative, the corresponding oestra-2,5(10)-dien-3-ol-17-one-3-methyl ether is prepared, by methods known to those skilled in the art, and is treated with lithium chloracetylide according to the process of the invention. Warming with a mineral acid then regenerates the 3-oxo-4-ene grouping.

In certain cases it may be advantageous to reduce an oxo group (other than at $C_{17}$) to hydroxyl and subsequently to regenerate it by oxidation.

The present invention provides veterinary preparations of the new 17α-chloroethynyl - 17β - hydroxy steroidal derivatives. Oral forms of administration are preferred to injectable preparations. In particular the products of the invention may be administered as tablets or as food additives.

Following is a description by way of example of methods of carrying the invention into effect.

EXAMPLE 1

*17α-chloroethynyl-androst-5-en-3β,17β-diol*

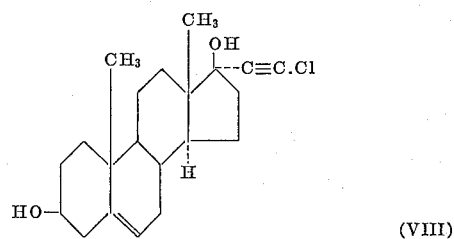

(VIII)

A solution of iodo-methane (57 g.) in anhydrous ether (100 ml.) was added slowly to a stirred suspension of lithium (5.55 g.) in anhydrous ether (200 ml.). The mixture was refluxed for a short time and then cooled to 0° C. Nitrogen was passed through the apparatus and a solution of trans-dichlorethylene (20 g.) in anhydrous ether (50 ml.) was added over 30 minutes. The mixture was allowed to warm to room temperature, and stirring was continued for a further 1½ hours. To the resulting solution of lithium chloracetylide, still under nitrogen, was added, with stirring, during 30 minutes a solution of dehydro-epi-androsterone (14.4 g.) in anhydrous toluene (300 ml.). The mixture was gently refluxed, with stirring, for 1½ hours, and then cooled to −60° C. Saturated ammonium chloride solution (25 ml.) was added, and the mixture was allowed to warm, with stirring, to room temperature, and extracted with ether. The ether solution was washed with dilute hydrochloric acid and then water, and was dried over sodium sulphate. After removal of the ether colourless crystals formed, M.P. 196° to 198° C. Recrystallisation from acetone gave colourless needles, of 17α-chloroethynyl-androst-5-en-3β,17β-diol, M.P. 201.5° C., [α]$_D^{25.5}$ −126° (c., 0.637 in chloroform). The process was applied in similar fashion to dehydroepiandrosterone 3-methyl ether (Chem. Absts., 1937, 2613).

EXAMPLE 2

*17α-chloroethynyl-6-methyl-androst-5-en-3β,17β-diol*

To a solution of lithium chloracetylide in ether (prepared by the method described in Example 1 from 2.8 g. of lithium 28.5 g. of iodo-methane and 10 g. of trans-dichlorethylene) was added, with stirring, under nitrogen, at room temperature, during 15 minutes, a solution of 6 - methyl - dehydro - epi - androsterone (Grenville, Patel, Petrow, Stuart-Webb and Williamson, J.C.S., 1957, 4105; Petrow and Kirk, British Patent No. 840,477) (7.4 g.) in dry toluene (175 ml.). The mixture was gently refluxed for 3 hours, and cooled to −70° C. Saturated ammonium chloride solution was added, and the mixture was allowed to warm to room temperature and extracted with ether. The ether solution was washed with dilute hydrochloric acid and water, and dried over sodium sulphate. Concentration under vacuum yielded crystals, M.P. 126° to 129° C., of crude 17α - chloroethynyl - 6-methyl-androst-5-en-3β,17-diol, which purified from aqueous acetone melted at 179° to 181° C., [α]$_D^{24.5}$ −104.4° (c., 0.435 in chloroform).

EXAMPLE 3

*17α-chloroethynyl-6α-methyl-androst-4-en-17β-ol-3-one*

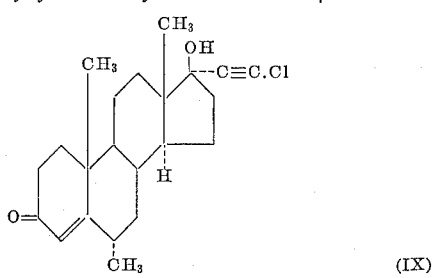

(IX)

Ethyl orthoformate (7.25 ml.) was added to a solution of 6α-methyl-androst-4-en-3,17-dione (Ackroyd, Adams, Ellis, Petrow and Stuart-Webb, J.C.S., 1957, 4099) (6.0 g.) in dioxan (29 ml.), followed by 5 drops of concentrated sulphuric acid, previously dissolved in dioxan (15 ml.). The mixture was allowed to stand for 30 minutes at room temperature, and then poured into water (1 litre) containing a little pyridine. The precipitate was collected and recrystallised from aqueous ethanol as pale yellow plates of the 3-ethyl-enol ether of 6α-methyl-androst-4-en-3,17-dione, M.P. 137° to 138° C.

A solution of this 3-ethyl-enol ether (3.7 g.) in anhydrous toluene (90 ml.) was added to a stirred solution of lithium chloracetylide in ether (prepared by the method described in Example 1 from 1.6 g. of lithium, 16.5 g. of iodo-methane and 5.8 g. of trans-dichlorethylene) under nitrogen, at room temperature, during 15 minutes. The mixture was gently refluxed for 2 hours, cooled to −70° C. and treated with a saturated aqueous solution of ammonium chloride, and allowed to warm to room temperature. Ether extraction, followed by removal of solvent under reduced pressure yielded a tar which was heated on the steam-bath for an hour with ethanol (100 ml.) containing concentrated hydrochloric acid (2 ml.). Pouring into water gave a tarry precipitate which was extracted with ether, the ether solution being treated with charcoal, dried over sodium sulphate and stripped. Recrystallisation of the resulting gum from acetone/hexane yielded crystals of 17α - chloroethynyl - 6α-methyl-androst-4-en-17β-ol-3-one, M.P. 146° to 149° C., further purification from ether/hexane raising the M.P. to 152.5° C., [α]$_D^{24.5}$ +8.3° (c., 0.252 in chloroform).

EXAMPLE 4

*17α-chloroethynyl-4-methyl-androst-4-en-17β-ol-3-one*

4-methyl-testosterone acetate (Sondheimer and Mazur, J. Amer. Chem. Soc., 1957, 79, 2906) (7.0 g.) and toluene-p-sulphonic acid monohydrate (0.35 g.) were added to ethylene glycol (210 ml.) and the mixture heated under a pressure of 0.5 mm. of mercury, at such a rate as to cause the glycol to distil very slowly. After 2 hours, the mixture was poured into aqueous sodium carbonate solution, precipitating the 3-ketal of 4-methyl-testosterone acetate as a colourless solid, M.P. 177° to 179° C.

This material (9.5 g.) was saponified by being refluxed with potassium hydroxide (5 g.) in methanol (200 ml.) and water (40 ml.) for 1½ hours. Concentration and cooling yielded the 3-ketal of 4-methyl-testosterone, M.P. 185° to 187° C.

To the mixture obtained by cautiously adding chromium trioxide (5.6 g.) to cooled pyridine (56 ml.) was added, at 0° C. with stirring, a solution of the 3-ketal of 4-methyl-testosterone (5.6 g.) in cold pyridine (56 ml.). The mixture was allowed to stand overnight, and then extracted with hot ethyl acetate, the resulting solution being filtered, cooled, washed with water, dried and stripped. Recrystallisation from aqueous methanol afforded the 3-ketal of 4-methyl-androst-4-en-3,17-dione, M.P. 176° to 178° C. (analytical sample, M.P. 210° to 212° C.)

To a stirred solution of lithium chloracetylide in ether (prepared as described in Example 1 from 0.66 g. of lithium, 6.8 g. of iodo-methane and 2.4 g. of transdichlorethylene) was added, under nitrogen, at room temperature, during 30 minutes, a solution of the 3-ketal of 4-methyl-androst-4-en-3,17-dione (1.98 g.) in 40 ml. of anhydrous toluene. The mixture was refluxed with stirring, for 2 hours, cooled to −60° C. and treated with saturated aqueous ammonium chloride solution (6 ml.) and allowed to warm to room temperature. Ether extraction, followed by washing with water, drying over sodium sulphate and removal of solvent under vacuum gave a discoloured product which was refluxed with aqueous methanol for a short time to remove the ketal group and regenerate the 3-oxo-group. Solvent was evaporated, and the residue, on trituration with carbon tetrachloride gave a solid, M.P. 163° to 167° C. Recrystallisation from acetone/hexane and from acetone alone gave colourless crystals of 17α-chloroethynyl-4-methyl-androst-4-en-17β-ol-3-one, M.P. 198° to 200° C. (uncorrected), [α]$_D^{25.6}$ +22° (c., 0.651 in ethanol).

EXAMPLE 5

*17-chloroethynyl-3-methoxyoestra-2,5(10)-dien-17β-ol*

To a stirred solution of lithium chloracetylide in ether (prepared as described in Example 1 from 0.56 g. of lithium, 5.7 g. of iodo-methane and 2.25 g. of transdichlorethylene), under nitrogen, at room temperature, was added, during 30 minutes, a solution of oestra-2,5(10)-dien-3-ol-17-one-3-methyl ether (1.48 g.) (A. L. Wilds and N. A. Nelson, J. Amer. Chem. Soc., 1953, 75, 5366; F. B. Colton, L. N. Nysted, B. Riegel and A. L. Raymond, J. Amer. Chem. Soc., 1957, 79, 1123) in anhydrous toluene (30 ml.). The mixture was refluxed with stirring for 2 hours, cooled to −60° C. and treated with saturated aqueous ammonium chloride (4 ml.), and allowed to warm to room temperature. The mixture was extracted with ether and the solution washed with water containing a little pyridine, dried over sodium sulphate and stripped under reduced pressure. The resulting material crystallised on standing. Trituration with methanol gave crude 17α - chloroethynyl-3-methoxyoestra-2,5(10)-dien-17β-ol. Purification from methanol gave colourless crystals, M.P. 126° to 127° C., [α]$_D^{28}$ +68.2° (c., 0.925 in dioxan).

*17α-chloroethynyl-19-nor-androst-4-en-17β-ol-3-one*

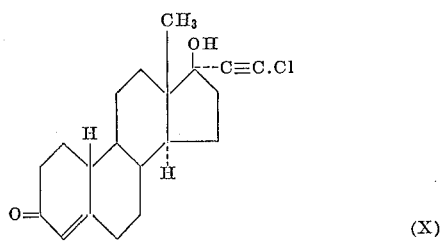

(X)

To a solution of 17α-chloroethynyl-3-methoxyoestra-2,5(10)-dien-17β-ol (0.41 g.) in methanol (22 ml.) at 60° C. was added 3 N hydrochloric acid (13.2 ml.) and the mixture was maintained at 60° C. for 15 minutes, cooled and poured on to ice. The white solid precipitated was collected, washed well with water and dried; M.P. 180° to 185° C. Recrystallisation from ethyl acetate yielded colourless crystals of 17α-chloroethynyl-19-nor-androst-4-en-17β-ol-3-one, M.P. 194 to 194.5° C., [α]$_D^{25.5}$ −41° (c., 0.807 in chloroform).

EXAMPLE 6

*17α-chloroethynyl-oestra-5(10)-en-17β-ol-3-one*

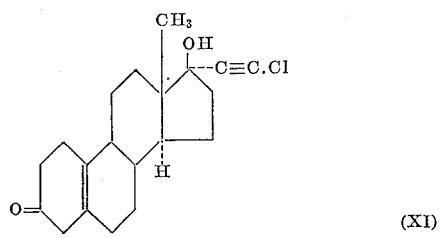

(XI)

A solution of anhydrous oxalic acid (0.78 g.) in water (15 ml.) was added to a solution of 17α-chloroethynyl-3-methoxyoestra-2,5(10)-dien-17β-ol (1.04 g.) in methanol (250 ml.) and the mixture was allowed to stand at room temperature for 1 hour. Ether (500 ml.) was added, and the solution was shaken with aqueous sodium bicarbonate solution, and then with water, dried and stripped. Purification by chromatography on alumina which had been washed with ethyl acetate, eluting with benzene, and recrystallisation from ether yielded 17α-chloroethynyl-oestra-5(10)-en-17β-ol-3-one, $\gamma_{max.}^{CCl_4}$ 3603, 2925, 2865, 2213, 1723, 1454, 1383 cm.$^{-1}$ $\gamma_{max.}^{CS_2}$ 1338, 1290, 1254, 1139, 1061, 1014, 828 cm.$^{-1}$

[α]$_D^{27}$ +98.3° (c., 0.866 in CHCl$_3$)

EXAMPLE 7

*17α-chloroethynyl-androst-4-en-17β-ol*

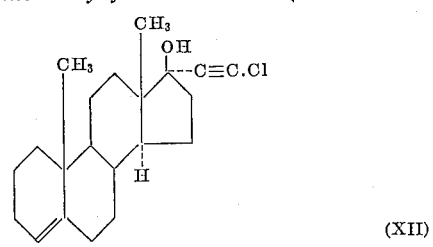

(XII)

A solution of androst-4-en-17-one (1.37 g.) (Marke, J. Amer. Chem. Soc., 1940, 62, 223) in anhydrous toluene (35 ml.) was added to a stirred solution of lithium chloracetylide in ether (prepared as described in Example 1 from 0.56 g. of lithium, 5.7 g. of iodo methane, and 2.0 g. of trans-dichlorethylene) under nitrogen, at room temperature during 30 minutes. The mixture was refluxed for 3 hours, cooled to −70° C. and treated with saturated aqueous ammonium chloride solution, and allowed to warm to room temperature. Ether extraction, the solution being washed with dilute hydrochloric acid and water, dried over sodium sulphate and stripped, yielded a tar which, on recrystallisation from aqueous methanol yielded 17α-chloroethynyl-androst-4-en-17β-ol, M.P. 120.5 to 121° C., [α]$_D^{25}$= +11.2° (c., 0.890 in CHCl$_3$), $\lambda_{max.}^{CCl_4}$ 3608, 2928, 2215, 1657, 1452, 1442, 1382, 1330

$\lambda_{max.}^{CS_2}$ 1290, 1127, 1064, 1053, 1025, 1003, 813

EXAMPLE 8

*17α-chloroethynyl-oestra-1,2,5(10)-trien-3,17β-diol*

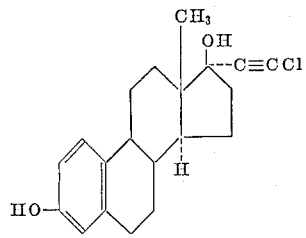

(XIII)

To a stirred solution of lithium chloracetylide in ether (prepared as described in Example 1 from 1.11 g. of lithium, 11.4 g. of iodo-methane and 4.0 g. trans-dichlorethylene) was added, under nitrogen, at room temperature, during 15 minutes, a solution of oestrone (2.70 g.) in anhydrous tetrahydrofuran (100 ml.). The mixture was refluxed with stirring for 1½ hours, cooled to −60° C. and treated with saturated aqueous ammonium chloride solution (7.5 ml.) and allowed to warm to room temperature. Ether extraction, followed by washing with water, drying over sodium sulphate, removal of ether and pouring into water gave a solid M.P. 118° to 123° C., which, recrystallised from benzene, afforded 17α-chloroethynyl-oestra-1,3,5(10)-trien-3,17β-diol, M.P. 190.5 to 191° C., [α]$_D^{30}$ −15° (c., 1.827 in chloroform).

The process was applied in similar fashion to 1-methyl-oestrone (Djerassi, Rosenkranz, Kaufman, Pataki and Romo, U.S.P. 2,791,592), 2-methyloestrone (Iriarte and Ringold, Tetrahedron, 1958, 3, 28), 1,2-dimethyl-Δ$^6$-dehydro-estrone (Iriarte and Ringold, loc. cit), 1,2-dimethyl-oestrone (Iriarte and Ringold, loc. cit), 2- and 4-methyl-oestrone (Peterson, Reineke, Murray and Sebek, Chem. and Ind., 1960, 1301), 6-methyl-Δ$^6$-dehydroestrone (Velarde, Iriarte, Ringold and Djerassi, J. Org. Chem., 1959, 24, 311) and 6β-methyloestrone (Velarde et al., loc. cit.).

EXAMPLE 9

*17α-chloroethynyl-3-methoxyoestra-1,3,5(10)-trien-17β-ol*

To a stirred solution of lithium chloracetylide in ether (prepared as described in Example 1 from 1.16 g. lithium, 1.2 g. of iodo-methane, and 4.2 g. of trans-dichlorethylene) was added, under nitrogen, at room temperature, during 30 minutes, a solution of oestrone-3-methyl ether (Thayer, Levin and Doisy, J. Biol. Chem., 1931, 91, 791) (3.0 g.) in anhydrous toluene (50 ml.). The mixture was refluxed, with stirring, for 3 hours, cooled to −70° C. and treated with saturated ammonium chloride solution, and allowed to warm to room temperature. Ether extraction, washing with water, drying and stripping gave a brown solid, which recrystallised from acetone/hexane and from aqueous methanol, yielded colourless needles of 17α-chloroethynyl-3-methoxyoestra-1,3,5(10)-trien-17β-ol, M.P. 166.5° C., [α]$_D^{25.5}$ −13.8° (c., 0.544 in chloroform).

The process was applied in similar fashion to other 3-ethers of oestrone i.e. oestrone 3-ethyl ether (Courrier, Velluz, Alloiteau and Rousseau, Compt rend. soc. biol., 1945, 139, 128), oestrone 3-allyl ether (Miescher and Scholz, Helv. Chim. Acta, 1937, 20, 1237) and oestrone 3-benzyl ether (Elsevier's Encyclopedia of Organic Chemistry, Series III, vol. 14, Supplement, p. 25,575).

EXAMPLE 10

*17α-chloroethynyl-androst-4-en-17β-ol-3,11-dione*

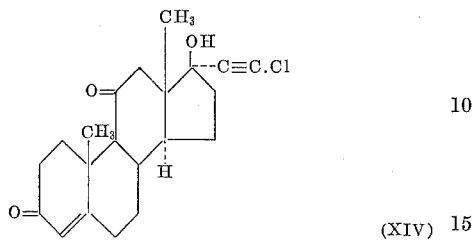

(XIV)

To a solution of lithium chloracetylide in ether (prepared as described in Example 1 from 0.56 g. of lithium, 5.7 g. of iodo-methane and 2.0 g. of trans-dichlorethylene) was added, under nitrogen, at room temperature, with stirring, during 30 minutes, a solution of 3-ethoxyandrosta-3,5-dien-11,17-dione (1.64 g.) (J. Biol. Chem., 1957, 228, 330. C. W. Marshall et al.) in dry toluene (50 ml.). The mixture was refluxed for 2 hours, treated at −60° C. with saturated aqueous ammonium chloride solution (5 ml.) and allowed to warm to room temperature. Ether extraction, the solution being washed with water, dried over sodium sulphate and stripped, yielded a brown solid, which was refluxed for 1 hour with aqueous methanol containing p-toluene sulphonic acid monohydrate (0.25 g.). The resulting solution was poured into water and the product recovered by ether extraction. Recrystallisation from aqueous methanol yielded colourless crystals of 17α-chloroethynyl-androst-4-en-17β-ol-3,11-dione, M.P. 211 to 211.5° C., $\lambda_{max.}$ 236 to 238 m$\mu$ ($\epsilon$, 15040), $\gamma_{max.}^{CCl_4}$ 3610, 2944, 2217, 1712, 1682, 1620, 1456, 1434, 1387, 1339, $\gamma_{max.}^{CS_2}$ 1272, 1124, 1057, 865.

EXAMPLE 11

*17α-chloroethynyl-oestra-1,3,5(10)-trien-3,17β-diol*

2,3-dihydro-pyran (2 ml.) and phosphorus oxychloride (2 drops) were added to a suspension of oestrone (2.0 g.) in tetrahydrofuran (60 ml.). The resulting clear solution was allowed to stand for 3 hours, and poured into dilute aqueous sodium bicarbonate solution. Ether extraction, trituration with petrol ether, and recrystallisation from aqueous acetone yielded the 3-tetrahydropyranyl ether of oestrone, M.P. 147° to 149° C.

To a solution of lithium chloracetylide in ether (prepared by the method described in Example 1 from 0.56 g. of lithium, 5.7 g. of iodo-methane and 2.0 g. of trans-dichlorethylene) was added, during 30 minutes, with stirring, under nitrogen, at room temperature, a solution of 3-tetrahydropyranyl ether of oestrone (1.75 g.) in toluene (100 ml.), and the mixture was refluxed for 2½ hours, treated at −60° C. with saturated aqueous ammonium chloride solution (5 ml.) and allowed to warm to room temperature. The product was extracted with ether, washing with water and drying over sodium sulphate, and solvent was removed under vacuum. The resulting material was refluxed for an hour in aqueous methanol containing 0.25 g. of p-toluene sulphonic acid monohydrate, and recovered by pouring into water, extracting with ether, washing with sodium bicarbonate solution and water, drying and stripping. Recrystallisation from benzene yielded 17α-chloroethynyl-oestra-1,3,5(10)-trien-3,17β-diol, identical with the product obtained in Example 8.

EXAMPLE 12

*17α - chloroethynyl - 17β - hydroxyandrosta-3,5-diene*

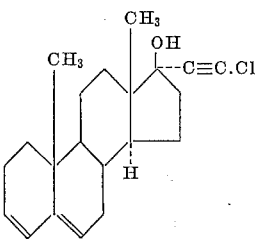

Small pieces of lithium (1.11 g.) were introduced into a flask fitted with stirrer, dropping funnel, gas inlet tube and reflux condenser. The metal was just covered with dry ether, and with exclusion of moisture, a solution of iodomethane (11.4 g.) in dry ether (20 ml.) was added dropwise over 30 minutes. When reaction had ceased, the mixture was refluxed for 10 minutes and then cooled in ice. Dry, oxygen-free nitrogen was passed through the apparatus, and a solution of trans-dichloroethylene (4 g.) in dry ether (15 ml.) was added slowly during 30 minutes. The ice-bath was removed and the mixture stirred for 1½ hours at room temperature. A solution of androstal-3,5-dien-17-one (Rosenkranz, Kaufmann and Romo, J. Amer. Chem. Soc., 1949, 71, 3689) (3 g.) in dry toluene (50 ml.) was added during 15 minutes, and the stirred mixture was refluxed under nitrogen for 3 hours. It was then cooled to −60° C. and the mixture treated with saturated ammonium chloride (5 ml.) added all at once. The mixture was permitted to warm to room temperature and to stand overnight. The product was isolated with ether and purified from aqueous methanol to give 17α-chloroethynyl-17β-hydroxyandrosta-3,5-diene in blades, M.P. 164 to 166° C., $[\alpha]_D^{27}$ −272° (c., 0.95 in chloroform), $\lambda_{max.}$ 228 m$\mu$ (log $\epsilon$ 4.26), 235 m$\mu$ (log $\epsilon$ 4.29) and 243.5 m$\mu$ (log $\epsilon$ 4.10).

EXAMPLE 13

*17α-chloroethynyl-4-methyloestra-1,3,5(10)-triene-1,17β-diol*

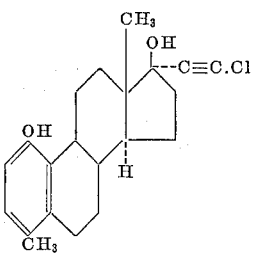

A solution of 1-hydroxy-4-methyloestra-1,3,5(10)-trien-17-one (1.4 g., cf. Dreiding and Voltman, J. Amer. Chem. Soc., 1954, 76, 537) in dry tetrahydrofuran (25 ml.) was added under dry, oxygen-free nitrogen, to a solution of the lithium derivative of chloracetylene [prepared from lithium methyl (0.5 g. Li and 2.5 ml. of MeL) and trans-dichlorethylene (1.75 ml.)] in dry ether (20 ml.) and the mixture was stirred and refluxed for 3 hours. Excess reagent was decomposed by the addition of saturated aqueous ammonium chloride to the ice-cooled mixture and the product, isolated with ether, was filtered through alumina (15 g.) in benzene/ether (4:1). The residue was crystallised from aqueous acetone to give 17α-chloroethylene - 4 - methyloestra - 1,3,5(10) - triene-1,17β-diol, as needles, M.P. 215 to 215.5° C., $[\alpha]_D^{27}$ +44.5° (c., 0.9 in chloroform).

EXAMPLE 14

*7α-chloroethynyl-1,4-dimethyloestra-1,3,5(10)-trien-17β-ol*

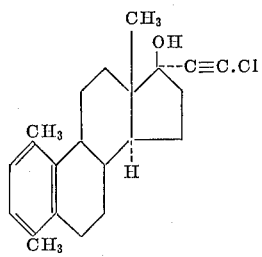

PREPARATION OF 1,4 - DIMETHYLOESTRA - 1,3,5(10)-TRIEN-17-ONE REQUIRED AS STARTING MATERIAL

A mixture of 17β-acetoxy-4-methylandrosta-1,4-dien-3-one (2 g.) (Sondheimer and Mazur, J. Amer. Chem. Soc., 1957, 79, 2906), lithium aluminum hydride (2 g.) and dry ether (300 ml.) was heated under reflux for 45 minutes. Excess reagent was decomposed by adding acetone to the cooled solution and the product, isolated with ether, was heated with acetic acid (15 ml.) and water (5 ml.) at 100° C. for 10 minutes. The product was isolated with ether and crystallised from methanol to give 1,4-dimethyloestra-1,3,5(10)-trien-17β-ol, M.P. 78 to 80° C.

To a solution of 1,4 - dimethyloestra - 1,3,5(10) - trien-17β-ol (0.7 g.) in acetone (10 ml.) was added dropwise with stirring, one of chromium trioxide in aqueous sulphuric acid (0.5 ml., 2.67 g. CrO$_3$ in 2.3 ml. H$_2$SO$_4$ 5 ml. H$_2$O). The solids obtained on pouring into water were crystallised from methanol to give 1,4-dimethyloestra-1,3,5(10)-trien-17-one as needles, M.P. 126 to 128° C., $[\alpha]_D^{24.5}$ +245° (c., 0.8 in CHCl$_3$).

A solution of 1,4-dimethyloestra-1,3,5(10)-trien-17-one (1 g.) in dry tetrahydrofuran (15 ml.) was added at room temperature, under nitrogen, to one of the lithium derivative of chloracetylene [prepared from lithium methyl (0.3 g. Li and 1.6 ml. MeI) and trans-dichlorethylene (1.2 ml.)] in dry ether (20 ml.) and the mixture was stirred and refluxed for 3 hours. Excess reagent was decomposed by the addition of saturated aqueous ammonium chloride, and the product isolated with ether was chromatographed on alumina (20 g.) in benzene. The residue was precipitated into water from acetone to give 17α-chloroethynyl - 1,4 - dimethyloestra - 1,3,5(10) - trien-17β-ol as an amorphous solid, $\gamma_{max.}^{Nujol}$ 3500, 2260, 810 cm.$^{-1}$

EXAMPLE 15

*17α-chloroethynyl-2,4-dimethyloestra-1,3,5(10)-trien-17β-ol*

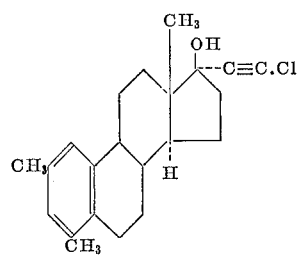

PREPARATION OF 2,4 - DIMETHYLOESTRA - 1,3,5(10)-TRIEN-17-ONE REQUIRED AS STARTING MATERIAL

A mixture of 17β-acetoxy-2α-methylandrosta-1,4-dien-3-one (5 g.) (Weston, Burn, Kirk and Petrow, British Patent 854,343) and lithium aluminium hydride, 10 g.) in dry ether (400 ml.) was heated under reflux for 1 hour. Excess reagent was decomposed with acetone and the product, isolated with ether, was treated with acetic acid (20 ml.) and water (4 ml.) at 100° C. for 15 minutes. The solids obtained on pouring into water were crystallised from methanol to give 2,4-dimethyloestra-1,3,5-(10)-trien-17β-ol as needles, M.P. 131 to 132° C., $[\alpha]_D^{26}$ +71° (c., 0.86 in CHCl$_3$).

To a solution of 2,4-dimethyloestra-1,3,5(10)-trien-17β-ol (2 g.) in acetone (20 ml.) was added one of chromium trioxide in aqueous sulphuric acid (1.5 ml.; see Example 14). The product obtained on pouring into water was crystallised from methanol to give 2,4-dimethyloestra-1,3,5(10)-trien-17-one as flakes, M.P. 188 to 191° C., $[\alpha]_D^{26}$ +148° (c., 0.85 in chloroform).

A solution of 2,4-dimethyloestra-1,3,5-(10)-trien-17-one (2.4 g.) in dry tetrahydrofuran (50 ml.) was added, under dry, oxygen-free nitrogen, to a solution of the lithium derivative of chloracetylene [prepared from lithium methyl (0.95 g. Li and 9.7 g. MeI) and trans-dichlorethylene (3.4 g.)] in dry ether (25 ml.) and the mixture was stirred and refluxed for 3 hours. The product was isolated as in the previous example and crystallised from methanol to give 17α-chloroethynyl-2,4-dimethyloestra-1,3,5(10)-trien-17β-ol as needles, M.P. 91.5 to 92.5° C., $[\alpha]_D^{26}$ −30° (c., 0.89 in chloroform).

EXAMPLE 16

*5β-methyl-17α-chloroethynyl-oestra-9(10)-en-3β,6β,17β-triol*

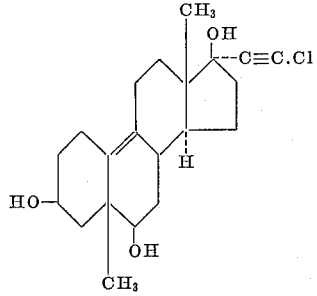

(a) To a solution of lithium chloracetylide in ether (prepared as described in Example 1 from 5.8 g. of lithium, 58.5 g. of iodo-methane, and 19.8 g. of trans-dichlorethylene) was added under nitrogen and at room temperature with stirring, during 30 minutes, a solution of 5β-methyloestra-9(10)-en-3β,6β-diol-17-one diacetate (8.33 g.; Davis and Petrow, J. Chem, Soc., 1949, 2973) in dry toluene (300 ml.) and the mixture refluxed for 2½ hours when it was cooled to −70° C., and treated with saturated aqueous ammonium chloride solution (20 ml.). After warming to room temperature, the mixture was extracted with ether, the etheral solution was washed with water, dried over calcium chloride and stripped at reduced pressure. The residue was refluxed for 1 hour with a solution of potassium hydroxide (11.5 g.) in methanol (600 ml.), the resulting solution being diluted with water and extracted with ether. The ethertal solution was washed with water dried over calcium chloride and the solvent removed. Recrystallisation of the residue from acetone/hexane and from aqueous ethanol yielded 5β-methyl-17α-chloroethylyloestra-9(10)-en-3β,6β,17β-triol as plates, M.P. 173 to 174° C., $[\alpha]_D^{26}$ +147° (c., 0.96 in ethanol), $\gamma_{max.}^{Nujol}$ 3336, 2215, 1186, 1068, 1033, 1004, 937 and 829 cm.$^{-1}$

EXAMPLE 17

*17α-chloroethynyl-3-methoxy-19-norandrosta-3,5-dien-17β-ol*

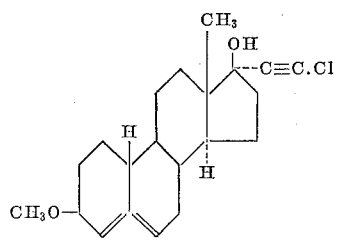

To a solution of lithium chloracetylide in ether (prepared as described in Example 1 from 3.98 g. of lithium, 40.4 g. of iodomethane and 16 g. of trans-dichlorethylene) was added, under nitrogen, at room temperature with stirring, over 30 minutes, a solution of 3-methoxyoestra-2,5(10)-dien-17-one (10.5 g.) in toluene (180 ml.) to which had been added a few drops of pyridine. After refluxing for 3 hours, the mixture was cooled to −60° C. and saturated ammonium chloride solution (25 ml.) was added. Ether extraction, washing with water, removal of ether under reduced pressure and removal of toluene by steam distillation yielded a brown gum which crystallised on trituration with methanol containing a little pyridine. Recrystallisation from methanol yielded 17α-chloroethynyl - 3-methoxy-19-norandrosta - 3,5-dien-17β-ol, M.P. 122 to 123° S., $\lambda_{max.}$ 241 m$\mu$ ($\epsilon$ 18,880), $[\alpha]_D^{28}$ −227° (c., 0.783 in dioxan).

EXAMPLE 18

*17α-chloroethynyl-2α-methylandrost-4-en-17β-ol*

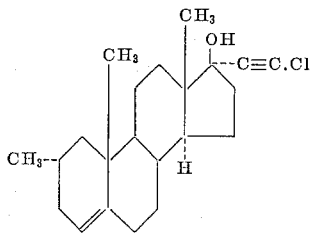

PREPARATION OF 2α-METHYLANDROST-4-EN-17-ONE REQUIRED AS STARTING MATERIAL

To a slurry of 17β-acetoxy-2α-methylandrost-4-en-3-one (Ringold et al., J. Amer. Chem. Soc., 1959, 81, 427) (10 g.) in ethane dithiol (10 ml.) was added boron trifluoride etherate (10 ml.) and the mixture was kept at room temperature for 10 minutes. The resulting solid was collected and washed with methanol. It was dissolved in dry tetrahydrofuran (100 ml.) and liquid ammonia (400 ml.) after which sodium was added until a permanent blue colour was obtained (ca. 3 g.). Excess sodium was destroyed by addition of ethanol and the ammonia allowed to evaporate off. The product, was isolated from the residue with ether and was acetylated with acetic anhydride (20 ml.) and pyridine (20 ml.) for 1 hour at 100° C. Dilution with water followed by crystallisation from methanol gave 17β-acetoxy-2α-methylandrost-4-en as needles, M.P. 114 to 115° C., $[\alpha]_D^{26}$ +62° (c., 1.2 in chloroform).

A solution of the foregoing acetate (5 g.) in methanol (30 ml.) and water (10 ml.) containing sodium hydroxide (2 g.) was refluxed for 1 hour. The product, isolated with ether, was oxidised at room temperature in acetone (25 ml.) with a solution of chromium trioxide in aqueous sulphuric acid (4 ml.; 2.67 g. $CrO_3$ in 2.3 ml. $H_2SO_4$ and 5 ml. water). The solid obtained on pouring into water was crystallized from methanol to give 2α-methylandrost-4-en-17-one as plates, M.P. 103 to 104° C., $[\alpha]_D^{26}$ +156° (c., 1.30 in chloroform).

A solution of the foregoing ketone (2.2 ml.) in dry tetrahydrofuran (50 ml.) was added under dry, oxygen-free nitrogen to a solution of the lithium derivative of chloracetylene [prepared from lithium methyl (0.9 g. Li and 9.1 g. MeI) and trans-dichlorethylene (3.2 ml.)] in dry ether (25 ml.) and the mixture was stirred and refluxed for 3 hours. Excess reagent was decomposed by the addition of saturated aqueous ammonium chloride to the cooled mixture and the product was isolated as in the foregoing example. After chromatography on alumina, it separated from ether as a gel which dried to an amorphous solid, being 17α-chloroethynyl-2α-methylandrost-4-en-17β-ol, $\lambda_{max.}^{Nujol}$ 3350, 2230 cm.$^{-1}$, $[\alpha]_D$ −10°(c. 0.85 in $CHCl_3$)

EXAMPLE 19

*17α-chloroethynyl-testosterone*

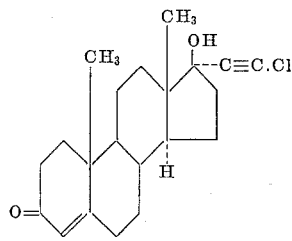

To a solution of lithium chloracetylide in ether (prepared by the method of Example 1 from 5.55 g. of lithium, 57 g. of iodo-methane and 20 g. of trans-dichlorethylene) was added under nitrogen, at room temperature, with stirring during 30 minutes, a solution of 3-ethoxyandrosta-3,5-dien-17-one (Riegel and Cheng Liu, J. Org. Chem. 1951, 16, 1610) (15.7 g.) in toluene (400 ml.). The mixture was refluxed for 2½ hours, cooled to −70° C. and treated with a saturated aqueous solution of ammonium chloride, and allowed to warm to room temperature. Ether extraction, followed by removal of solvent under reduced pressure yielded a residue which was refluxed for 1 hour with aqueous methanol containing p-toluene sulphonic acid monohydrate (1.0 g.). The resulting solution was cooled and extracted with ether. The ether solution was washed with sodium bicarbonate solution and water, dried over sodium sulphate and stripped. The residue was purified by recrystallisation from acetone/hexane to give 17α-chloroethynyltestosterone, M.P. 183.5 to 184.5° C. (uncorrected), $[\alpha]_D^{25.5}$ +9.0° (c., 0.555 in chloroform), $\lambda_{max.}$ 240.5 m$\mu$ ($\epsilon$ 16,510), $\gamma_{max.}^{CCl_4}$ 3607, 2217, 1679, 1617 cm.$^{-1}$, $\gamma_{max.}^{CS_2}$ 1331, 1272, 1200, 1188, 1126, 1064, 1053, 1025, 948, 864, 826 cm.$^{-1}$

EXAMPLE 20

*17α-chloroethynyl-5α-androstan-17β-ol-3-one*

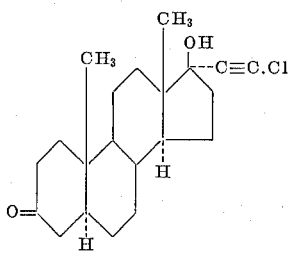

PREPARATION OF Δ²-3-METHOXY-5α-ANDROSTEN-17-ONE REQUIRED AS STARTING MATERIAL

Androstendione enol methyl ether (13.05 g.) was hydrogenated in a mixture of ethyl acetate (400 ml.), ethanol (100 ml.) and pyridine (0.3 ml.) using a palladium/barium sulphate catalyst (3. g.). Uptake of hydrogen ceased when one molar proportion of hydrogen had been absorbed. Filtration, evaporation of solvents and purification from methanol containing a drop of pyridine afforded the product (12.0 g.), M.P. 96 to 98° C.

A solution of lithium chloracetylide was prepared in the usual way, using lithium (4.0 g.), methyl iodide (37.8 g.) and trans-dichlorethylene (12.9 g.) in ether (175 ml.), and a solution of Δ²-3-methoxy-5α-androsten-17-one (10 g.) in pure, dry tetrahydrofuran (250 ml. containing 1 drop of pyridine) was added. After heating for one hour under reflux, the solution was left overnight, and then saturated ammonium chloride solution (30 ml.) was added at −60° C. The mixture was allowed to come to room temperature, stirred for four hours, and extracted with ether. The product contained in the ether extracts was dissolved in 1% hydrochloric acid in methanol, set aside for five minutes, diluted with water, left overnight, then filtered off and dried by suction.

This crude solid was dissolved in benzene (250 ml.) and the filtered solution poured through a short column of activated alumina. Elution with one litre of benzene afforded the product (7.3 g.) which was purified further by recrystallisation from moist methanol and then di-isopropyl ether. 17α-chlorethynyl-5α-androstan-17β-ol-3-one had M.P. 206.5° C., $[α]_D^{26}$ —19° (c., 0.952 in $CHCl_3$).

EXAMPLE 21

*17α-chloroethynyl-17β-hydroxy-4α-methyl-5α-androstan-3-one*

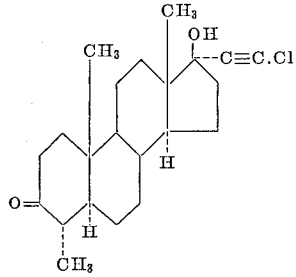

17β-acetoxy-4α-methyl-5α-androstan-3-one (Julian et al., J. Amer. Chem. Soc. 1948, 70, 3872) (5 g.), dioxan (15 ml.), methyl orthoformate (5 ml.) and toluene p-sulphonic acid (5 ml.) were stirred together at room temperature for 30 minutes. Pyridine (2 ml.) was added and the product isolated with ether. Crystallisation from methanol containing a few drops of pyridine gave 17β-acetoxy-3-methoxy-4α-methyl-5α-androst-2-ene, needles, M.P. 145 to 147° C.

Hydrolysis of the foregoing compound (5 g.) with a solution of potassium hydroxide (2.5 g.) in methanol (300 ml.) and water (25 ml.) under reflux for 1 hour gave 3-methoxy-4α-methyl-5α-androst-2-en-17β-ol, needles from aqueous methanol containing a few drops of pyridine, M.P. 173 to 175° C.

The foregoing 3-methoxy-4α-methyl-5α-androst-2-en-17β-ol (7 g.) was dissolved in pyridine (70 ml.) and added to a suspension of pyridine/chromate [prepared by adding chromium trioxide (7 g.) in portions to pyridine (70 ml.)] and the mixture was left at room temperature for 24 hours. The reaction mixture was filtered through a filter aid and the solids were well washed with hot ethyl acetate. The combined filtrates were washed with water (5 times) and evaporated to dryness in vacuo. Crystallisation of the residue from methanol containing pyridine gave 3-methoxy-4α-methyl-5α-androst-2-en-17-one, plates, M.P. 180 to 182° C.

Dry, oxygen-free, nitrogen was passed through the apparatus during the following reaction. Clean lithium (1.11 g.), cut into thin strips, was placed under dry ether (50 ml.) in a flask fitted with stirrer and condenser, and methyl iodide (11.4 g.) in ether (20 ml.) was added slowly. When the reaction was complete, the mixture was refluxed for 10 minutes, and then cooled in ice. A solution of transdichlorethylene (4 g.) in ether (10 ml.) was added slowly over 30 minutes, the ice-bath removed and the mixture stirred at room temperature for 90 minutes. A solution of 3-methoxy-4α-methyl-5α-androst-2-en-17-one (3.16 g.) in dry toluene (50 ml.) was added over 30 minutes and the mixture was refluxed for 3 hours, and then cooled quickly to —60° C. and 5 ml. of a saturated solution of ammonium chloride added. The reaction was allowed to warm to room temperature overnight and the product isolated with ethyl acetate. The crude product was dissolved in 1% methanolic hydrogen chloride and heater under reflux for 15 minutes to hydrolyse the 3-enol methyl ether. 17α-chloroethynyl-17β-hydroxy-4α-methyl-5α-androstan-3-one was purified from acetone as needles, M.P. 206 to 206.5° C., $[α]_D^{26}$ —35° (c., 0.92 in chloroform.

EXAMPLE 22

*17α-chloroethynyloestra-1,3,5(10)-trien-17β-ol*

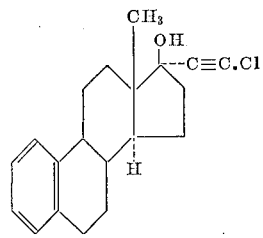

A solution of oestra-1,3,5(10)-trien-17-one (3.3 g.) (prepared by the process of U.S.P. 2,947,763) in dry tetrahydrofuran (70 ml.) was added, under dry, oxygen-free nitrogen, to a stirred solution of the lithium derivative of chloracetylene [prepared from lithium methyl (1.4 g. Li and 14.6 g. MeI) and trans-dichlorethylene (5.1 g.)] in dry ether (75 ml.) and the mixture heated under reflux for 3 hours. Excess reagent was decomposed by the addition of saturated aqueous ammonium chloride (10 ml.) to the ice-cooled mixture and the product was isolated with ether. Chromatography onto alumina in benzene solution, and crystallisation of the chromatographed material from aqueous methanol gave 17α-chloroethynyloestra-1,3,5(10)-trien-17β-ol as plates, M.P. 59 to 60° C., $[α]_D^{25}$ —17° (c., 1.0 in chloroform).

EXAMPLE 23

*17α-chloroethynyl-11β,17β-dihydroxandrost-4-en-3-one*

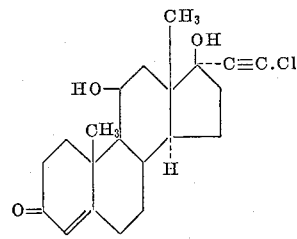

11β-hydroxyandrost-4-ene-3,17-dione (Brooks and Norymberski, Biochem. J., 1935, 55, 371) (19 g.) and toluene p-sulphonic acid (4 g.) were dissolved in formic acid (98/100%; 900 ml.) and the solution allowed to stand at room temperature for 24 hours. Much of the formic acid was then removed by distillation under reduced pressure, the residual solution was poured into water and the product isolated with methylene chloride. The extracts were washed with aqueous sodium bicarbonate solution until neutral and then with water, dried and evaporated. Crystallisation of the product from ether afforded 11β-formyloxyandrost-4-ene-3,17-dione, M.P. 134 to 136° C., $[α]_D$ +203° (c., 1.2 in $CHCl_3$). This compound (18 g.) in dry dioxane (180 ml.) was treated with trimethyl orthoformate (18 ml.), toluene p-sulphonic acid (900 mgm.), and 5 drops of methanol, and the mixture allowed to stand at room temperature for two hours. Pyrodine (10 ml.) was then added and the solution poured into a large volume of water with stirring. The oil which separated eventually solidified and was isolated by filtration. Crystallisation from aqueous methanol afforded 3-methoxy-11β-formyloxyandrosta-3,5-dien-17-one. This compound (18 g.) was refluxed for one hour with methanolic potassium hydroxide solution (2.5%; 200 ml.). Water (30 ml.) was added and the methanol removed in vacuo whereupon the product crystallised and, after the addition of more water, was isolated by filtration. Crystallisation from methanol and from ether/hexane afforded 3-methoxy-11β-hydroxyandrosta-3,5-dien-17-one, M.P. 184 to 187° C., $[α]_D$ —73° (c., 0.98 in $CHCl_3$).

A solution of methyl lithium was prepared by reacting lithium metal (6.35 g.) with iodomethane (65.5 g.) in dry ether (200 ml.). To this solution maintained at 0° C. under pure, dry nitrogen was added dropwise during 30 minutes a solution of trans-dichlorethylene (23 g.) in dry ether (60 ml.). The mixture was then stirred at room temperature for 1½ hours. A solution of 3-methoxy-11β-hydroxyandrosta-3,5-dien-17-one (16.8 g.) in dry tetrahydrofuran (250 ml.) was then added during 30 minutes and the mixture was refluxed with continued stirring for 3 hours. It was then cooled to —40° C. a saturated aqeous solution of ammonium chloride (70 ml.) was added and the mixture was left overnight. More water was added, and the product was isolated with ether. Crystallisation of a portion of the resulting oil afforded 3-methoxy-17α - chloroethynyl - 11β,17β - dihydroxyandrosta-3,5-diene. The bulk of the crude product was dissolved in methanol (300 ml.) and treated with a solution of oxalic acid (15 g.) in water (50 ml.). After standing at room temperature for 20 hours the solution was concentrated in vacuo, diluted with water and the product isolated with methylene dichloride. The resulting oil was chromatographed on 400 g. of alumina. Elution with benzene/chloroform (1:1) and chloroform, and crystallisation from ethyl acetate gave 17α-chloroethynyl-11β,17β-dihydroxyandrost-4-en-3-one, M.P. 205 to 205.5° C., dec., [α]$_D$ +40° (c., 0.82 in CHCl$_3$).

EXAMPLE 24

*4-methyl-17α-chloroethynyloestra-1,3,5(10)-trien-17β-ol*

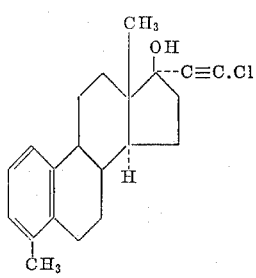

A solution of iodo-methane (14.25 g.) in anhydrous ether (25 ml.) was added slowly to a stirred suspension of lithium (1.40 g.) in anhydrous ether (50 ml.). The mixture was stirred at room temperature for 30 minutes, and then cooled to 0° C. Nitrogen was passed through the apparatus and a solution of trans-dichlorethylene (5 g.) in anhydrous ether (15 ml.) was added slowly. The mixture was then allowed to warm to room temperature, and stirred for 1½ hours. A solution of 3.35 g. of 4-methyloestra-1,3,5(10)- trien-17-one (Gentles, Moss, Herzog and Hershberg, J. Amer. Chem. Soc., 1958, 80, 3702) in anhydrous toluene (120 ml.) was added over 30 minutes, and the mixture was refluxed with stirring for 2½ hours, and then cooled to — 60° C. 20 ml. of saturated ammonium chloride solution was added, and the mixture was allowed to warm to room temperature, and extracted with ether. The ether solution was washed with water, dried over sodium sulphate, treated with charcoal and stripped. The resulting brown gum was dissolved in ether and allowed to flow quickly through a short alumina column, eluting with more ether. Stripping yielded a yellow gum which solidified on standing. Recrystallisation from acetone/hexane yielded 4 - methyl - 17α-chloroethynyloestra-1,3,5(10)-trien-17β-ol, M.P. 132 to 132.5° C., [α]$_D^{26}$ —18.5° (c., 0.97 in chloroform).

EXAMPLE 25

*17α-chloroethynyl-6-methyl-3-methoxy-19-nor-androsta-3,5-dien-17β-ol*

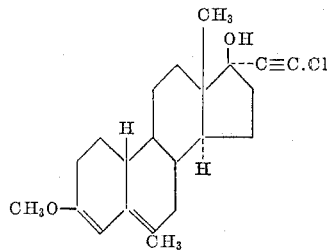

6α-methyl-19-nor-androst- 4- en - 3,17 - dione (Villotti, Djerassi and Ringold, J. Amer. Chem. Soc., 1959, 81, 4566) (3 g.), anhydrous dioxan (30 ml.), trimethyl orthoformate (3 ml.) and methanol (1 ml.) were stirred and treated with toluene-p-sulphonic acid (0.15 g.). After 45 minutes, pyridine (1 ml.) was added, followed by water, dropwise, until the product separated out. Purification from aqueous methanol containing a drop of pyridine gave 3-methoxy - 6 - methyl-19-nor-androsta-3,5,-dien-17-one as needles, M.P. 153 to 155° C., [α]$_D^{26}$ —145° (c., 1.010 in dioxan), λ$_{max}$ 247 mµ (ε 19,470).

To a solution of lithium chloracetylide in ether (prepared by the method of Example 1 from 0.48 g. of lithium, 5.0 g. of iodo-methane and 1.75 g. of trans-dichlorethylene) at room temperature, under nitrogen, was added, with stirring, during 30 minutes, a solution of 3-methoxy-6-methyl-19-nor-androsta-3,5-dien-17-one (130 g.) in anhydrous toluene (30 ml.). The mixture was stirred under reflux for 3 hours, cooled to —70° C. and treated with saturated aqueous ammonium chloride solution (5 ml.). After warming to room temperature the product was isolated with ether. The residue solidified when triturated with methanol. Purification from methanol containing a drop of pyridine yielded 17α-chloroethynyl-6-methyl-3-methoxy-19-nor-androsta-3,5-dien-17β-ol, M.P. 160 to 161° C., [α]$_D^{26}$ —260° (c., 0.964 in dioxan), λ$_{max.}$ 246.5 mµ (ε 18,952).

*17a-chloroethynyl-6α-methyl-19-nor-testosterone*

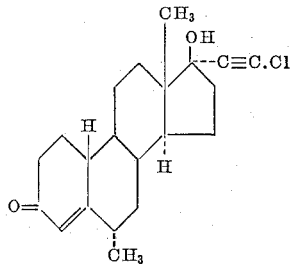

A mixture of 17α-chloroethynyl-6-methyl-3-methoxy-19-nor-androsta-3,5-dien-17β-ol (0.80 g.), methanol (200 ml.) and a solution of anhydrous oxalic acid (1.8 g.) in water (20 ml.) was heated under reflux for 1 hour, cooled and poured into water. Ether extraction, washing with sodium bicarbonate solution and water, drying over sodium sulphate and stripping yielded a residue which solidified on standing. Purification from ethyl acetate yielded 17α - chloroethynyl-6α-methyl-19-nor-testosterone (17α-chloroethynyl - 6α-methyl-19-nor-androsta-4-en - 3 - one), M.P. 165 to 166° C., [α]$_D^{27}$ —76.7° (c., 1.104 in CHCl$_3$), λ$_{max.}$ 240 mµ (ε 15,430).

λ$_{max.}^{CCl_4}$ 3605, 2210, 1681, 1619 cm.$^{-1}$

EXAMPLE 26

*Preparation of scored tablets each containing 25 mg. of 17α - chloroethynyl - 3 - methoxyoestra - 1,3,5(10)-trien-17β-ol for veterinary use*

G.

| 17α - chloroethynyl - 3 - methoxyoestra - 1,3,5(10)-trien-17β-ol | 25 |
|---|---|
| Lactose | 84 |
| Starch paste, 10 percent, w./w., a sufficient quantity. | |
| Magnesium stearate | 1.3 |
| Starch, sufficient to produce 129.6 g. | |

The first two ingredients are thoroughly mixed with two-thirds of the starch and granulated with a suitable quantity of 10 percent starch paste, followed by tray drying at 50° C. The resultant granules are processed through a 20 mesh sieve and the lubricant (magnesium stearate) added, together with sufficient starch to produce the required weight. Tablets each weighing 194.4 mg. are compressed from this mixture, using punches of convenient diameter, and suitably embossed to provide a breakline.

EXAMPLE 27

*17α-chloroethynyl-4-methyl-5-androst-3-en-17β-ol*

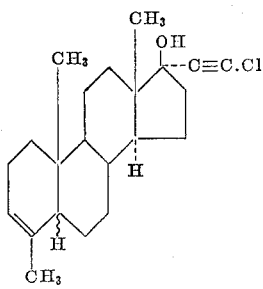

A mixture of 4-methyl testosterone (20.8 g.), diethylene glycol (200 ml.), potassium hydroxide (20 g.) and 100% hydrazine hydrate (20 ml.) was heated to 200° C. during 1 hour, with stirring, under nitrogen, in an open flask, the evolved gases (nitrogen, water and hydrazine vapour) being allowed to escape. The temperature was kept at 200±5° C. for 2 hours, then the mixture was allowed to cool somewhat and was poured into water. The product was extracted with benzene, which was washed, dried (Na₂SO₄) and evaporated. Crystallisation of the product from acetone/hexane yielded 4-methyl-5-androst-3-en-17β-ol, M.P. 116 to 118° C., sufficiently pure for the next stage. A further quantity was obtained by chromatography on alumina of the residue from stripping the mother-liquor, elution with benzene yielding first the 5'-isomer and then the required 5-isomer.

To a solution of 4-methyl-5ξ-androst-3-en-17β-ol (0.50 g.) in acetone (10 ml.) was added 0.50 ml. of a solution prepared by dissolving chromium trioxide (26.72 g.) in concentrated sulphuric acid (23 ml.) and making up to 100 ml. with water. The reaction mixture was stirred for 10 minutes and poured into a saturated solution of sulphur dioxide in water (300 ml.). The resulting precipitate was collected, washed with water and dried. Recrystallisation from methanol yielded 4-methyl-5ξ-androst-3-en-17-one as plates, M.P. 141 to 143° C., sufficiently pure for the next stage.

To a solution of lithium chloracetylide in ether (prepared by the method of Example 1 from 0.55 g. of lithium, 5.2 g. of iodo-methane and 1.8 g. of trans-dichlorethylene) was added at room temperature, under nitrogen, with stirring, a solution of 4-methyl-5ξ-androst-3-en-17-one (1.4 g.) in toluene (50 ml.) and the mixture was refluxed with stirring for 3 hours, cooled to −70° C. and treated with a saturated aqueous solution of ammonium chloride. After warming to room temperature, the product was extracted with ether and the ethereal solution was washed with water, dried over sodium sulphate and evaporated under reduced pressure. Purification of the residue by chromatography onto alumina, eluting with benzene containing 10% ether, and recrystallisation from methanol yielded 17α-chloroethynyl-4-methyl-5ξ-androst-3-en-17β-ol, M.P. 131.5° C., $[\alpha]_D^{26}$ −52° (c., 1.143 in CHCl₃).

EXAMPLE 28

*17α-chloroethynyl-19-nor-androst-4-en-17β-ol*

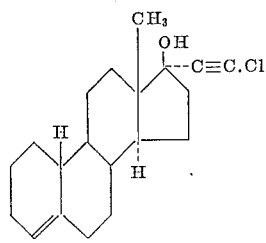

To a solution of lithium chloracetylide in ether (prepared by the method of Example 1 from 5.37 g. of lithium, 55.1 g. of iodo-methane and 19.34 g. of trans-dichlorethylene) was added at room temperature, with stirring during 30 minutes, under nitrogen, a solution of 19-nor-androst-4-en-17-one (B.P. 811, 961) (12.47 g.) in toluene (250 ml.) and the mixture was refluxed for 2 hours, cooled to −60° C. and treated with saturated aqueous ammonium chloride solution. Ether extraction and removal of solvent under reduced pressure gave a product which was purified by recrystallisation from hexane yielding 17α-chloroethynyl-19-nor-androst-4-en-17β-ol, M.P. 84° C., $[\alpha]_D^{27}$ +59.2° (c., 1.084 in CHCl₃).

EXAMPLE 29

*17α-chloroethynylandrostane-3β,5α,6β,17β-tetrol*

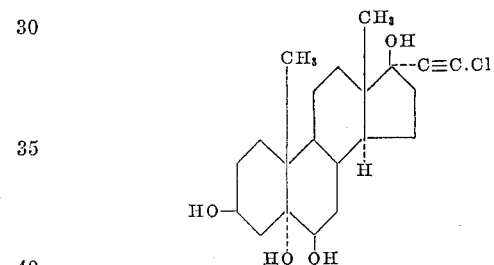

3β,5α,6β-trihydroxyandrostan-17-one (Ehrenstein, J. Org. Chem., 1939, 4, 506) (4 g.) in tetrahydrofuran (500 ml.) was added under nitrogen to an ethereal solution of lithium chloracetylide prepared from lithium (2 g.), methyl iodide (10 ml.) and trans-dichlorethylene (6 ml.). The mixture was refluxed for 2 hours, cooled to −60° C., and treated with saturated aqueous ammonium chloride (25 ml.). The product was isolated with ether/methylene dichloride and purified from acetone/hexane. 17α-chlorethynylandrostane-3β,5α,6α,17β-tetrol separated in needles, M.P. 225.5 to 223° C., $[\alpha]_D^{22}$ −55° (c., 0.90 in dioxan).

EXAMPLE 30

*17α-chloroethynyl-3β,17β-dihydroxy-5α,6α-epoxyandrostane*

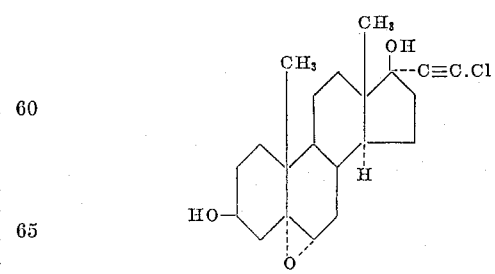

5α,6α-epoxy-3β-hydroxyandrostan-17-one (Ehrenstein and Decker, J. Org. Chem., 1940, 5, 544) (7.2 g.) in toluene (200 ml.) was added under nitrogen to an ethereal solution of lithium chloracetylide prepared from lithium (2.8 g.), methyl iodide (28.5 g.) and trans-dichlorethylene (10 g.). The mixture was refluxed for 2½ hours, cooled to −60° C., and treated with aqueous ammonium chloride (25 ml.). The product was isolated with ether and crystallised from aqueous acetone to give 17α-chloroethynyl - 3β,17β - dihydroxy-5α,6α-epoxyandrostane in needles, M.P. 218.5° C., [α]$_D^{27}$ —117° (c., 0.89 in chloroform).

EXAMPLE 31

*17α-chloroethynyl-3β,17β-dihydroxy-5β,6β-epoxyandrostane*

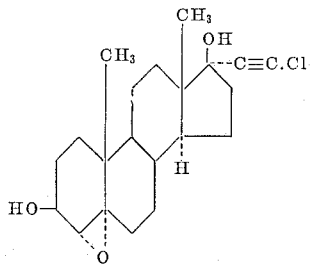

5β,6β-epoxy-3β-hydroxyandrostan-17-one (Davis and Petrow, J. Chem. Soc., 1949, 2536) (3.8 g.) in toluene (100 ml.) was added under nitrogen to an ethereal solution of lithium chloracetylide prepared from lithium (2.5 g.), methyl iodide (12.5 ml.) and trans-dichlorethylene (8 ml.). The mixture was refluxed for 2½ hours, cooled to —60° C., and treated with saturated aqueous ammonium chloride (25 ml.). The product was isolated with ether/methylene dichloride and purified from aqueous ethanol to give 17α-chloroethynyl-3β,17β-dihydroxy-5β,6β-epoxyandrostane in needles, M.P. 200 to 203° C., [α]$_D^{24}$ —58° (c., 1.0 in chloroform).

EXAMPLE 32

*17α-chloroethynyl testosterone*

To a solution of lithium chloracetylide in ether (prepared as in Example 1, from 1.37 g. of lithium, 14.2 g. of iodo-methane and 5 g. of trans-dichlorethylene) was added, with stirring, during 30 minutes, under nitrogen, at room temperature, a solution of androst-4-en-3,17-dione-3-ethylene mercaptole (J. W. Ralls and B. Riegel, J. Amer. Chem. Soc., 1954, 76, 4479) (5.45 g.) in toluene (100 ml.), the mixture being refluxed for 3 hours. It was cooled to —60° C. treated with saturated aqueous ammonium chloride solution, allowed to warm to room temperature and extracted with ether. The ethereal solution was washed with water, dried (Na$_2$SO$_4$) and evaporated under reduced pressure. The residue was heated under reflux for 1 hour with a mixture of dioxan (30 ml.), methanol (100 ml.) and concentrated hydrochloric acid (10 ml.). The resulting solution was cooled, diluted with water and extracted with ether, and the ethereal solution was washed with dilute aqueous sodium hydroxide solution and with water, dried (Na$_2$SO$_4$) and evaporated under reduced pressure. Purification of the residue from acetone/hexane yielded 17α-chloroethynyl-testosterone identical with the material reported in Example 19, λ$_{max}$. 239.5 to 241 (ε 15,960), γ$_{max.}^{CCl_4}$ 3605, 2211, 1680, 1618 cm.$^{-1}$, γ$_{max.}^{CS_2}$ 1330, 1270, 1188, 1129, 1063, 1053, 1023, 949, 863, 823 cm$^{-1}$

EXAMPLE 33

*17α-chloroethynyl-17β-hydroxy-6α-methyl-5α-androstan-3-one*

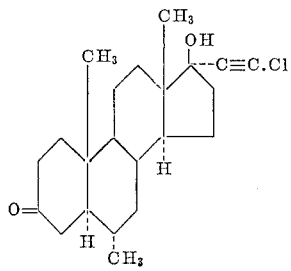

A solution of 6α-methyltestosterone acetate (10.2 g.) in dry ether (100 ml.) was added to a solution of lithium (0.65 g.) in liquid ammonia (1 l.), and left for a period of twenty minutes, with frequent swirling. Ammonium chloride (15 g.) was added, and, after evaporation of the ammonia, the product, which consisted of 6α-methyl-5α-androstan-17β-ol-3-one acetate admixed with the free alcohol, was isolated with ether. Saponification was completed by refluxing the crude product in ethanol (150 ml.) and water (20 ml.) with potassium hydroxide (10 g.) for a period of forty minutes, then diluting with water, filtering and drying.

The crude material so obtained was dissolved in acetone (50 ml.) and treated with excess of a solution of chromium trioxide (26.72 g.) in sulphuric acid (23 ml.) diluted to 100 ml. with water. Water was added, and the product isolated by extraction with methylene chloride. Further purification was effected by chromatography on alumina (120 g.) in benzene. Elution with benzene and recrystallisation from isopropyl ether/hexane gave 6α-methyl-5α-androstane-3,17-dione, M.P. 138 to 140° C.

A suspension of 6α-methyl-5α-androstane-3,17-dione (1.5 g.) in methanol (10 ml.) was treated with oxalic acid (100 mg.). After three minutes' continuous swirling, homogeneity resulted. In fifteen minutes' time sufficient pyridine was added to ensure alkalinity, and the solution diluted with water. After the precipitated oil had solidified, the solid was collected, washed with water and dried by suction yielding crude 3,3-dimethoxy-6α-methyl-5α-androstan-17-one, M.P. 122 to 125° C.

This crude 3,3-dimethoxy derivative in tetrahydrofuran (100 ml., containing one drop of dry pyridine) was added to a solution of lithium chloracetylide (from 10 g. of trans-dichlorethylene) in ether (150 ml.). The solution was refluxed for 30 minutes, cooled to —60° C. and treated with saturated ammonium chloride solution. The organic phase was worked up exactly as described in Example 20, giving the product, 17α-chloroethynyl-17β-hydroxy-6α-methyl-5α-androstan-3-one, M.P. 201.5 to 202.5° C., decomp. [α]$_D^{26}$ —5.2° (c., 0.828 in chloroform).

We claim:
1. A process for the preparation of 17α-chloroethynyl steroids having, apart from substituents and unsaturated linkages in rings A, B, C and D, the formula

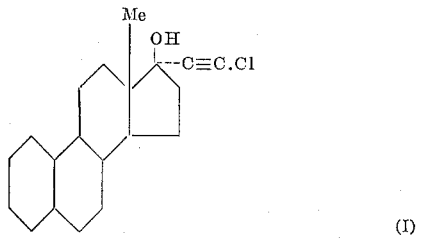

which process comprises reacting a corresponding 17-oxo steroid with lithium chloracetylide and subsequently regenerating the desired derivative from the complex so formed.

2. A process as claimed in claim 1 wherein the lithium chloracetylide is prepared by adding a solution of cis- or trans-1,2-dichlorethylene in ether to a solution of a lithium alkyl in ether.

3. A process as claimed in claim 2 wherein the lithium chloracetylide is prepared by adding a solution of trans-1,2-dichlorethylene in ether to a solution of lithium methyl in ether.

4. A process as claimed in claim 1 wherein the 17-oxo steroidal starting material is dissolved in an organic solvent selected from the group consisting of toluene and tetrahydrofuran.

5. A process as claimed in claim 1 wherein the 17α-chloroethynyl steroid is regenerated from the complex 6. A 17α-chloroethynyl steroid of the oestrane series having the formula:

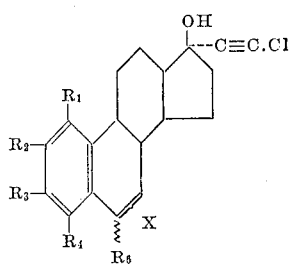

where $R_1$ is selected from the group consisting of hydrogen, methyl and hydroxyl; $R_2$, $R_4$ and $R_6$ are selected from the group consisting of hydrogen and methyl; $R_3$ is hydrogen; and X is selected from the group consisting of single and double bonds.

7. 17α-chloroethynyloestra-1,3,5(10)-trien-17β-ol.
8. 17α-chloroethynyl-4-methyloestra-1,3,5(10)-trien-17β-ol.
9. 17α-chloroethynyl-1,4-dimethyloestra-1,3,5(10)-trien-17β-ol.
10. 17α-chloroethynyl-2,4-dimethyloestra-1,3,5(10)-trien-17β-ol.
11. 17α-chloroethynyl-4-methyloestra-1,3,5(10)-triene-1,17β-diol.

References Cited by the Examiner

UNITED STATES PATENTS 3,141,016  7/1964  Wettstein et al. ___ 260—239.55

OTHER REFERENCES

Viehe: "Chem. Ber.," vol. 92 (1959), page 1950.

LEWIS GOTTS, *Primary Examiner.*

E. L. ROBERTS, *Assistant Examiner.*